United States Patent [19]
Karasudani et al.

[11] 4,068,743
[45] Jan. 17, 1978

[54] DISC BRAKE SUPPORT STRUCTURE

[75] Inventors: Yasuo Karasudani, Yokohama; Tetsuo Haraikawa, Funabashi, both of Japan

[73] Assignee: Tokico Ltd., Japan

[21] Appl. No.: 694,997

[22] Filed: June 11, 1976

[30] Foreign Application Priority Data

June 20, 1975 Japan .................. 50-85876

[51] Int. Cl.² ............................................. F16D 55/00
[52] U.S. Cl. ............................. 188/71.1; 188/18 A; 188/73.3
[58] Field of Search .................. 188/18 A, 71.1, 72.4, 188/72.5, 73.3, 73.4

[56] References Cited

U.S. PATENT DOCUMENTS

| 3,448,831 | 6/1969 | Newstead | 188/73.4 |
| 3,612,226 | 10/1971 | Pauwels | 188/73.3 |
| 3,964,581 | 6/1976 | Habgood | 188/73.3 |

FOREIGN PATENT DOCUMENTS

| 1,072,115 | 12/1959 | Germany | 188/72.4 |
| 918,205 | 2/1963 | United Kingdom | 188/73.3 |

Primary Examiner—George E. A. Halvosa
Attorney, Agent, or Firm—Wenderoth, Lind & Ponack

[57] ABSTRACT

A disc brake has a stationary supporting member straddling a rotatable disc for supporting a pair of friction pads which slide on the opposite sides of the disc, the supporting member being secured to a non-rotatable part of a vehicle by two circumferentially spaced and axially extending bolts. An abutment surface is formed on the supporting member for engaging with a complementary surface formed on a shoulder portion of the non-rotatable part at a location radially inward with respect to each of the bolts and circumferentially outside the two bolts.

3 Claims, 5 Drawing Figures

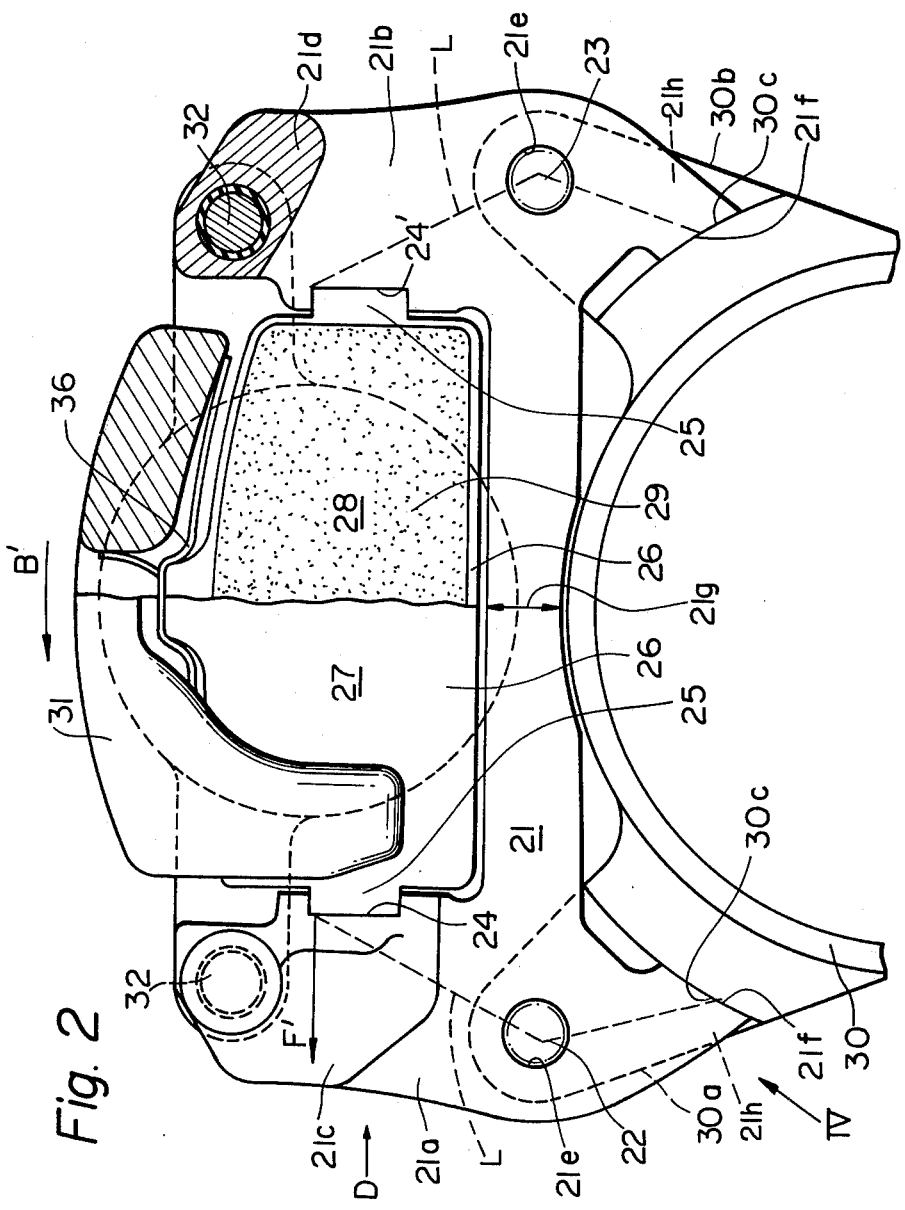

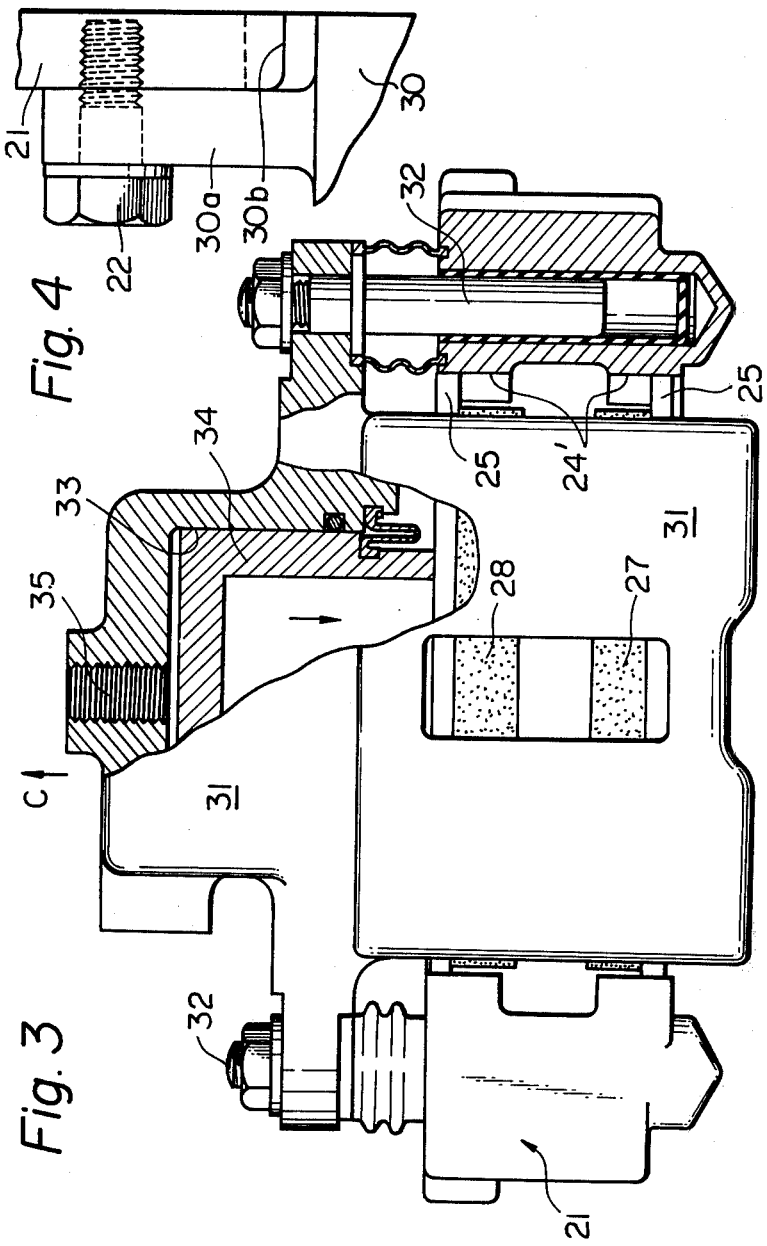

DISC BRAKE SUPPORT STRUCTURE

This invention relates to a disc brake and, more particularly, to a disc brake of the kind comprising a stationary supporting member secured to a non-rotatable part of a vehicle by at least one axially extending bolt and straddling a rotatable disc to slidably support a pair of friction pads disposed on the opposite sides of the disc.

In the prior art disc brakes of the aforementioned kind, braking torque acting on the friction pads in applying brake force is directly transmitted to the non-rotatable part of the vehicle through the stationary supporting member supporting the friction pads, and the torque has sometimes caused failure such as cracks or the like in the supporting member.

One of the prior art disc brakes of the aforementioned kind is shown in FIG. 1, in which, a generally U-shaped stationary supporting member 1 is secured by two axially extending bolts 2 and 3 to a non-rotatable part of a vehicle such as an axle 10. Two radially extending arms 1a and 1b of the member 1 have a shape of an inverted U as viewed in the direction of arrow A in FIG. 1 to straddle the outer periphery of a rotatable disc (not shown) and have axially and radially inwardly extending arm portions 1c and 1d respectively. Grooves 4 and 4' are formed in the arms 1a and 1b and the arm portions 1c and 1d respectively to receive projections 5 and 5' formed on the back plates 6 of friction pad assemblies 7 and 8. Each of the friction pad assemblies 7 and 8 comprises a pad 9 of friction material bonded to the back plate 6.

Assuming that brake is applied when the disc is rotating in the direction of arrow B in FIG. 1, braking torque or drag F acts on the stationary member as shown in the drawing at point 11. Since the distance between the point 11 and a line connecting the bolts 2 and 3 is relatively large, a large torque will be induced in the supporting member 1 around the bolt 2, and a large stress will act on the section C in the supporting member 1, and thus, failure such as cracks or the like will sometimes be observed in such section. When the disc rotates in the opposite direction, a similar phenomenon will be observed except that the torque will act around the bolt 3.

An object of the present invention is to prevent the aforementioned discrepancies in the prior art disc brakes of this kind by providing an abutment surface on the stationary supporting member for engaging with a complementary surface formed on the shoulder portion of the non-rotatable part, which abutment surface is spaced circumferentially from the mounting bolt in the direction of rotation of the disc, namely, at a location on the trailing side of the bolt on the trailing side when two bolts are provided.

Thus, it is possible to transmit the torque induced in the supporting member when the brake is applied to the non-rotatable part, which torque has been transmitted to the non-rotatable part through the bolt on leading side in the prior art disc brakes. Thereby, it is possible to reduce the dimension of the supporting member or to form the supporting member from a material of inferior strength and, further, failure such as cracks in the supporting member can substantially be prevented which improves the durability of the disc brake.

These and further objects and effects of the present invention will become apparent from the following description taken in conjunction with the accompanying drawings in which:

FIG. 2 is a view similar to FIG. 1, but showing a disc brake according to the present invention.

FIG. 3 is a partially broken away plan view of the disc brake of FIG. 2.

FIG. 4 is a partial view looking in the direction of arrow IV in FIG. 2.

Figure 1:
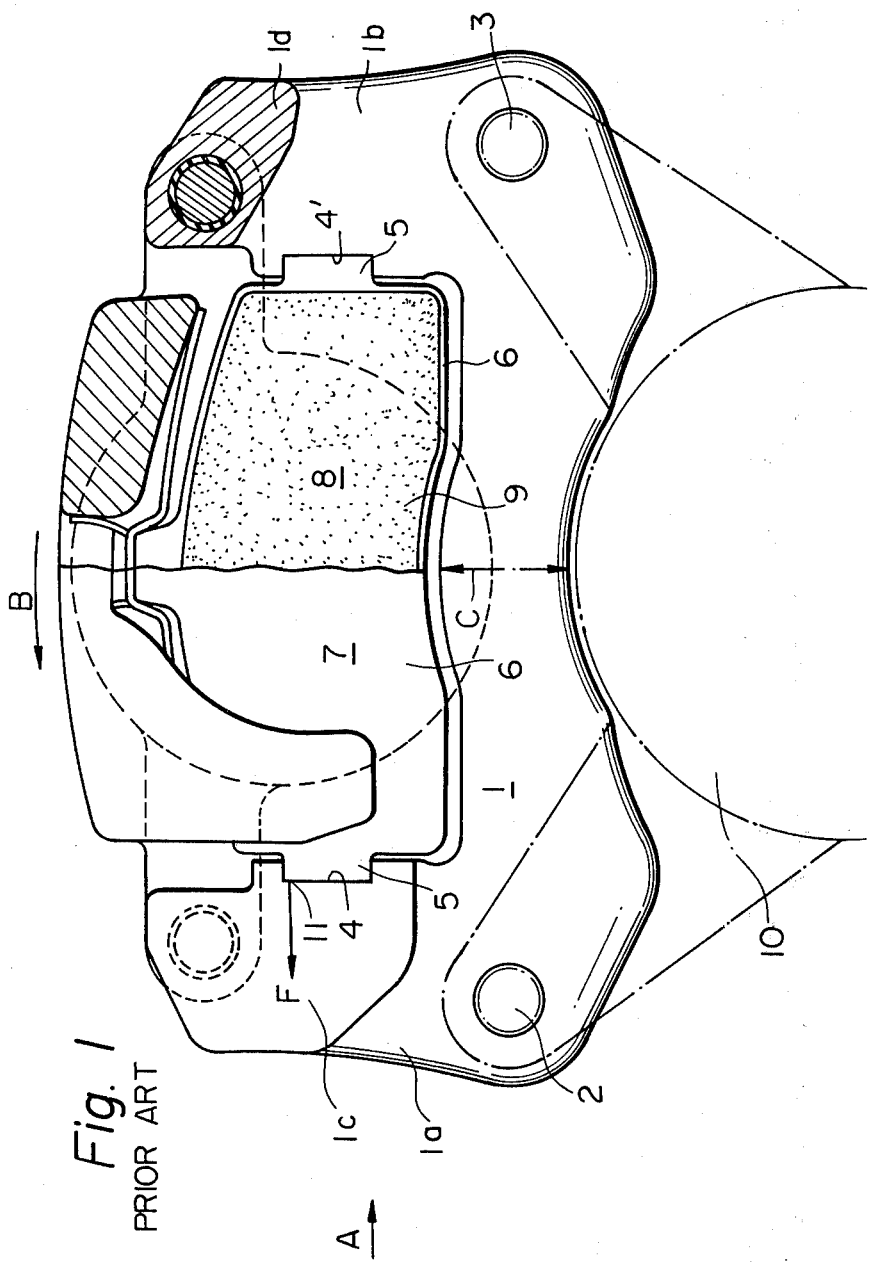
FIG. 1 is a partially broken away end view of a prior art disc brake, wherein the section in the broken away portion is taken through a surface of the rotatable disc (not shown).

In FIGS. 2 and 3, a generally U-shaped stationary supporting member 21 has two radially extending arms 21a, 21b which have the shape of an inverted U as viewed in the direction of arrow D in FIG. 2 forming axially and radially extending arm portions 21c and 21d straddling the outer periphery of a rotatable disc (not shown). The supporting member 21 has two threaded bores 21e for receiving mounting bolts 22 and 23 by which the supporting member 21 is secured to a non-rotatable part of a vehicle such as arms 30a and 30b extending from an axle housing 30.

Axial grooves 24 and 24' are formed respectively in the arms and arm portions 21a and 21c and 21b and 21d of the member 21 for slidably receiving projections 25 formed on opposite circumferential ends of back plates 26 of a pair of friction pad assemblies 27 and 28 which comprise pads 29 of friction material bonded to the back plates 26 and which are movable toward and away from the opposite surfaces of the rotatable disc.

Extending from the supporting member 21 adjacent each of the threaded bores 21e are abutment arms 21h which each form the other end of a lever L, the one end of which is formed by the portion of the supporting member 21 between the bolt 22 or 23 and the groove 24 or 24', and which is pivoted around bolt 22 or 23. The arm surfaces at the free ends of the arms 21h are axially extending abutment surfaces 21f thereon for engaging with the surfaces formed by the free ends of the shoulders 30c formed on the arms 30a and 30b to oppose pivoting of the arms 21h toward the center of supporting member 21. The engagement between the shoulders 30c and the abutment surfaces 21f is thus adapted to counteract the counterclockwise torque around the bolt 22 and the clockwise torque around the bolt 23 in the supporting member 21.

It will be noted that in the embodiment shown the abutment surfaces 21f are located radially inwardly, with reference to the axis of rotation of the disc, relative to the bolts 22 and 23 and are spaced circumferentially from the bolts respectively such that the surfaces 21f are positioned outside, relative to the periphery of the axle housing 30, of the bolts 22 and 23. Thus, when the disc is rotating in one direction, for example, in the direction of arrow B' as viewed in FIG. 2, and brake force is applied, braking torque caused in the supporting member and acting around the bolt 22 on the trailing side will be transmitted to the non-rotatable part 30 through the leftside abutment surface 21f which is spaced circumferentially from the bolt 22 in the direction of the trailing side or in the direction of rotation of the disc.

A calliper 31 is slidably mounted on the supporting member 21 by two axially extending parallel pins 32. A cylinder bore 33 is formed in the calliper 31 for slidably receiving a piston 34. When liquid under pressure supplied from a master cylinder (not shown) or the like is introduced into the bore 33 through an inlet 35, the piston 33 urges the friction pad assembly 28 against one surface of the disc directly, and the calliper 31 moves in the opposite direction relative to the piston 34 and urges the friction pad assembly 27 against the other surface of the disc. A retaining spring 36 is disposed between the calliper 31 and the friction pad assemblies 27 and 28 to prevent rattling noise, but the spring 36 is omitted in FIG. 3.

Further description relating to the detailed construction and operation of the calliper 31 is omitted since the present invention is applicable to disc brakes having a calliper of any other type, for example, a calliper slidably engaging with grooves formed in the stationary supporting member.

When brake force is applied on the disc which is rotating in the direction of arrow B' in FIG. 2, braking drag F will act on the supporting member 21 causing a torque around the mounting bolt 22, but the torque will be received on the shoulder 30c. Thus, section 21g of the supporting member will not receive any stress from the torque, and it is possible to reduce the dimension or the rigidity of the supporting member.

Figure 5:
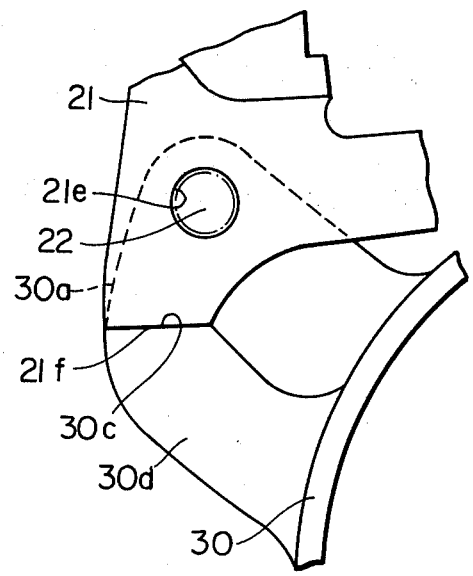
FIG. 5 is a partial view showing a modified form of the disc brake of FIG. 2.

FIG. 5 shows a modified form of the supporting member 21 and the non-rotatable part 30 of the disc brake of FIG. 2, in which, the abutment surface 21f is modified to extend in the direction parallel to the line connecting the bolts 22 and 23 at the position radially inwardly relative to the bolt 22 and circumferentially outside relative to the bolts 22 and 23. In the drawing, the reference numeral 30d denotes a portion having thickness larger than the remaining portion of the arm 30a for defining the shoulder 30c.

What is claimed is:

1. A disc brake comprising: a rotatable disc; a stationary supporting member, only two axially extending and circumferentially spaced, relative to the disc, mounting bolts securing said supporting member to a non-rotatable part of a vehicle on one side of the disc; a pair of friction pads on the opposite sides of the disc; a pair of axially extending and circumferentially spaced arms integral with the supporting member on which the friction pads are slidably guided and for receiving braking torque from the friction pads when the brake is actuated, and clamping means engaged with the friction pads for urging the friction pads against the disc; said supporting member having at least one abutment arm thereon extending from adjacent one of the mounting bolts radially inwardly toward the non-rotatable part and forming the other end of a lever the one end of which is formed by the portion of the supporting member between said mounting bolt and the point on the side of the supporting member corresponding to said bolt at which said friction pads are slidably guided and which lever is pivoted around said bolt, said abutment arm having an arm surface at the free end thereof; and an abutment integrally formed as part of said non-rotatable part and having a surface on the free end thereof against which the arm surface at the free end of said abutment arm abuts for opposing pivoting of said abutment arm around said bolt toward the part of said supporting member between said bolts, whereby when the disc is rotating with the periphery moving toward said abutment arm, the torque transmitted to said supporting member from said friction pads is opposed by said abutment.

2. A disc brake as claimed in claim 1 further comprising an abutment arm adjacent the other bolt, and a further abutment on said non-rotatable part opposing rotation of said further abutment arm toward the part of said supporting member between said bolts, whereby the torque transmitted to the supporting member during braking is opposed regardless of the direction of rotation of said disc.

3. A disc brake as claimed in claim 1 in which said abutment is circumferentially outwardly of said bolt relative to the periphery of said disc.

* * * * *